United States Patent Office 3,149,983
Patented Sept. 22, 1964

---

3,149,983
PROCESS FOR THE PREPARATION OF GLASS MAKING BATCHES
Léon Maris and Louis Malarme, Brussels, Belgium, assignors to Solvay & Cie, Brussels, Belgium, a Belgian company
No Drawing. Filed Mar. 22, 1960, Ser. No. 16,644
Claims priority, application Belgium, Apr. 10, 1959, 577,573
5 Claims. (Cl. 106—52)

The present invention concerns a process for the preparation of glass making batches containing sand and sodium carbonate preserving, at a temperature lower than 35° C. or even lower than 0° C., a moist state capable of imparting to said batches improved properties for stocking and use.

By glass making batches are meant weighed mixtures of various ingredients which must be introduced in furnaces used for the manufacture of glass. These mixtures are prepared in advance and, in general, must be stored in storage bins or in unit batch containers. They consist mainly of sand and sodium carbonate, the latter may be present in the state of either dense or light soda; they contain, in addition, dolomite, limestone, feldspar, sometimes a rather important proportion of sodium sulphate, and other minor ingredients such as reducers, refiners, coloring matters or bleaching agents, etc., Thus, by way of example, a typical batch may include the following components, assumed weighed dry, and not including the minor ingredients:

|  | Kg. |
|---|---|
| Sand | 570 |
| Sodium carbonate | 185 |
| Sodium sulphate | 35 |
| Dolomite | 140 |
| Limestone | 35 |
| Feldspar | 35 |
|  | 1000 |

In order to facilitate handling the batches, and particularly, to preserve their homogeneity—which is essential to obtain a regular production and a glass of high and constant quality—it is advisable to avoid the formation of dust as far as possible, to impart good flowing properties to the mixture and particularly to avoid the segregation of the components of which the granulometric characteristics are often very different.

To achieve these objects it is known to use undried sand or even to moisten the mixture by introducing a quantity of water such that the total water content reaches 4 to 10% of the weight of sand.

The water thus added is fixed by the sodium carbonate which successively is converted into monohydrate, then into heptahydrate; the batch only preserves its moist state—the essential condition which imparts to it the qualities quoted above—if the temperature is maintained above a certain level: for example, at 35° C. in the absence of sodium sulphate or at 34° C. in the presence of this product. This is probably due to the fact that the moist state of the batch depends on the appearance of a liquid phase resulting from the liberation of crystallisation water, for example through the conversion of sodium carbonate heptahydrate into monohydrate, this phenomenon being possible only at a given temperature.

The applicants have shown in Belgian Patent No. 577,318 of April 2, 1959, that this temperature can be lowered to about 26° C. by adding to the batches controlled proportions of sodium chloride and water. Nevertheless, it is often necessary to provide for heating appliances in order to maintain the batches at a temperature ensuring an adequate moist state.

The present invention affords the possibility of avoiding this drawback. In fact, the applicants have now found that it is possible to obtain a liquid phase below 35° C., indeed even below 0° C., by adding to the batch a certain proportion of caustic soda and water. According to the process of the present invention, caustic soda is used in such quantity that the mixture will contain, effectively at the state of NaOH, between 0.1 and 22.2 kg. per metric ton of batch and per fraction of about 10 litres of water present in the liquid phase, that is the water in excess over the quantity necessary for the possible formation of hydrates of sodium carbonate; if the maximum quantity indicated is exceeded, there will be formation of caustic soda hydrates and drying up of the mixture. There must be present a sufficient quantity of water to form the desired volume of liquid phase; in practice, the volume of liquid phase is preferably maintained between 5 and 30 litres per metric ton of batch.

In Table 1 is shown, by way of example, the effect produced upon the formation of a liquid phase, at 0, at 15 and at 25° C., by the addition of a quantity of 1 kg. of caustic soda per metric ton of a batch such as that mentioned at the beginning of the specification.

*Table 1*

| Volume of liquid phase, l./m.t. of batch | Water present in the liquid phase, l./m.t. of batch | Temperature, ° C. | Quantity of NaOH, kg./m.t. of batch | Total quantity of water present, kg./m.t. of batch |
|---|---|---|---|---|
| 3.3 | 3.2 | 0 | 1 | 40 |
| 4 | 3.8 | 15 | 1 | 40 |
| 6.1 | 5.7 | 25 | 1 | 40 |

The difference between the total quantity of water present and the quantity of water in the liquid phase is fixed in the form of monohydrate and heptahydrate of sodium carbonate.

Under the conditions stated in Table 1, but in the absence of caustic soda, no liquid phase is formed, the water being entirely fixed as hydrates of sodium carbonate and the batch is dry.

Between 35° C. and a temperature slightly lower than 15° C., the presence of a sufficient quantity of caustic soda may prevent the formation of hydrates of sodium carbonate. On the other hand, below that temperature, monohydrate is formed and it is necessary to take it into account to calculate the quantity of water to be added; in this case, the maximum quantity of caustic soda that can be used is brought down, from 22.2 kg., per metric ton of batch and per fraction of about 10 litres of water present in the liquid phase, to a lower value, which is all the lower as the temperature is smaller, the value being equal, at 0° C., to 5.5 kg. per metric ton of batch and per fraction of about 10 litres of water in excess of the quantity necessary to convert the sodium carbonate into monohydrate.

The use of caustic soda in the glass making batches affords the possibility not only of forming a liquid phase without having a heat the mixture, but also of avoiding the variations in the volume of the liquid phase which are dependent on the temperature. It is known, in fact, that under the action of small variations of temperature glass making batches may be converted from a state which is not moist enough, into a state which is too moist, which can be the cause of segregation of the components and of flowing difficulties. Up to now this drawback has been overcome only by keeping the temperature of the batch as constant as possible, which, in practice, is not easy to arrange.

The applicants have now discovered that by adding a sufficient quantity of caustic soda to the batch, there can be maintained in it, from a minimum temperature $t_1$ below 35° C., a volume of liquid phase which does not depend on the temperature. This action might be ascribed to the fact that the addition of suitable quantities of caustic soda prevents, from and above 0° C., the formation of hydrates of sodium carbonate other than the monohydrate.

The minimum quantity of caustic soda to be used in order to obtain this effect depends on the volume of liquid phase which it is desired to keep in the batch and on the minimum temperature $t_1$ at which that volume of liquid phase is to be present. In Table 2 are given the quantities of caustic soda and water which must be present in a batch similar to the one given at the beginning of the specification, when it is desired to make sure that there be, from a minimum temperature $t_1$ included between 0 to 35° C., a moist state which does not depend on the temperature.

Table 2

| Volume of liquid phase, l./m.t. of batch | Water present in the liquid phase, l./m.t. of batch | Minimum temperatures $t_1$, °C. | Minimum quantities of NaOH, kg./m.t. of batch | Minimum quantities of water kg./m.t. of batch |
| --- | --- | --- | --- | --- |
| 10 | 10 | 0  | 3.1 | 40 (30+10) |
| 21 | 20 | 0  | 6.2 | 50 (30+20) |
| 11 | 10 | 15 | 2.7 | 40 (30+10) |
| 21 | 20 | 15 | 5.4 | 50 (30+20) |
| 11 | 10 | 25 | 1.8 | 40 (30+10) |
| 21 | 20 | 25 | 3.6 | 50 (30+20) |
| 11 | 10 | 33 | 0.5 | 40 (30+10) |
| 22 | 20 | 33 | 1   | 50 (30+20) |

This table shows that when it is desired to keep a constant volume of liquid, from 0° C., the minimum quantity of caustic soda which must be present is 3.1 kg. per metric ton of batch and per fraction of about 10 litres of liquid phase; being at the equilibrium with the monhydrated sodium carbonate, the quantity of water to be added must be equal to the sum of the quantities necessary for the conversion of the sodium carbonate into monohydrate (about 30 litres per metric ton for a batch containing 185 kg. of $Na_2CO_3$/m.t. similar to that stated at the beginning of the specification), on the one hand, and for the formation of the liquid phase, on the other hand, that is nearly the desired volume of liquid phase (preferably included between 5 and 30 litres per metric ton of batch). If the minimum temperatures $t_1$ are 15, 25 or 33° C., the minimum quantities of caustic soda to be used are respectively 2.7, 1.8 and 0.5 kg. per metric ton of batch and per fraction of about 10 litres of water present in the liquid phase. The quantities of caustic soda to be added at other minimum temperatures $t_1$ greater than 0° C., can easily be obtained by interpolation of the previous data.

In any case, the quantity of caustic soda to be used must remain below a certain maximum depending on the minimum temperature $t_1$ from which it is desired to ensure the constancy of the liquid phase, and on the maximum temperature up to which this constancy is to be ensured. These maximum quantities are indicated in Table 3.

Table 3

| Minimum temperature $t_1$, °C. | Maximum quantity of NaOH, kg./m.t. of batch and per 10 litres of water in the liquid phase, up to the maximum temperatures of: | | | | | |
| --- | --- | --- | --- | --- | --- | --- |
| | 15° C. | 25° C. | 33° C. | 40° C. | 50° C. | 60° C. |
| 0  | 5.5 | 5.5 | 5.5 | 5.5 | 5.5 | 5.3 |
| 15 | 8.7 | 7.4 | 6.7 | 6.3 | 5.8 | 5.3 |
| 25 | ---- | 7.4 | 6.7 | 6.3 | 5.8 | 5.3 |
| 33 | ---- | ---- | 6.7 | 6.3 | 5.8 | 5.3 |

From these data it follows that:

If $t_1=0°$ C.: the maximum quantity of NaOH which is ensuring constancy of the volume of liquid phase is
  5.5 kg. up to 50° C.
  5.3 kg. up to 60° C.
If $t_1=15°$ C.: the maximum quantity of NaOH is
  7.4 kg. up to 25° C.
  6.7 kg. up to 33° C.
  6.3 kg. up to 40° C.
  5.8 kg. up to 50° C.
  5.3 kg. up to 60° C.

and so on.

In practice, the batch may reach temperatures higher than 35° C. at the exit of the mixer, even in the absence of heating, in view of the heat of hydration of the sodium carbonate. In general, there will be a constant quantity of liquid phase up to these temperatures if the effective quantity of caustic soda is limited to a maximum of 5.5 kg. per metric ton of batch and per fraction of about 10 litres of water present in the liquid phase.

It is known, on the other hand, that when batches are being prepared, some components or some granulometric fractions of the components tend to adhere to the walls of the apparatus used for making the mixture, which may be the cause of serious heterogeneity in the mass of the batch. In some cases, it is noticed also that the batch, even in the moist state, tends to cake during storage previous to charging, thereby complicating the handling after storage. It is generally tried to alleviate this disadvantage by adding more water to the mixture, but this can only have an unfavourable effect upon the formation of dusts and the tendency to segregation of the components It seems that the phenomena of gripping to the walls of the mixer can be ascribed to the presence of an excess of free water in the batch at the start of the operation of mixing, as a result of the slow progress of the reactions of hydration of the hygroscopic salts present in the batch, particularly when their granules are big. On the other hand, the phenomenon of caking of the batch during storage can also be ascribed to the slowness of reaction of the hydration of those hygroscopic salts and more particularly to the fact that these reactions are not yet completed at the exit of the mixer, when the duration of mixing is relatively short.

Now, here again, the applicants have discovered that the use of caustic soda may avoid these disadvantages because it makes it possible to obtain at once and to maintain, from a minimum temperature $t_2$ included between 35° C. and a temperature slightly lower than 15° C., a volume of liquid phase which does not depend on the temperature and on the time of contact of the constituents of the mixture. The quantities of caustic soda to be used are higher than in the cases considered above and depend on the volume of water present in the mixture and also on the minimum temperature at which this effect is to be obtained.

As an example, there will be given in the Table 4 below, the quantities of caustic soda and water to be used for batches similar to those given at the beginning of the specification, in order to ensure immediately a constant volume of liquid phase.

Table 4

| Volume of liquid phase, l./m.t. of batch | Water present in the liquid phase, l./m.t. of batch | Minimum temperature $t_2$, °C. | Quantities of NaOH, kg./m.t. of batch | | Quantities of water, kg./m.t. of batch |
|---|---|---|---|---|---|
| | | | Minimum | Maximum | |
| 13 | 10 | 15 | 8.7 | 22.2 | 10 |
| 25 | 20 | 15 | 17.4 | 44.4 | 20 |
| 12 | 10 | 25 | 7.4 | 22.2 | 10 |
| 24 | 20 | 25 | 14.8 | 44.4 | 20 |
| 12 | 10 | 33 | 6.7 | 22.2 | 10 |
| 23 | 20 | 33 | 13.4 | 44.4 | 20 |
| 12 | 10 | 35 | 6.5 | 22.2 | 10 |
| 23 | 20 | 35 | 13 | 44.4 | 20 |

It can be seen that in these cases no hydrates of sodium carbonate are formed. On the other hand, it can be seen that in order to form immediately and to maintain at 15° C. a constant volume of liquid phase, the minimum quantity of caustic soda which must be present is 8.7 kg. per metric ton and per fraction of about 10 litres of water present; the maximum quantity is 22.2 kg., at which limit there are formed hydrates of caustic soda which dry up the mixture. If the temperatures are 25, 33 or 35° C., the quantities of caustic soda to be used are respectively at least 7.4, 6.7 and 6.5 kg. per metric ton of batch and per fraction of about 10 litres of water, the maximum quantity remaining always 22.2 kg. For other temperatures higher than 15° C., it is easy to calculate the values by interpolation of the above data.

The quantities of caustic soda and water to be used for batches can be expressed also in terms of the volume of liquid to be obtained for each metric ton of batch. The data given in the tables can be converted readily to a "weight of caustic soda per litre of liquid volume per metric ton of batch" basis, by using the specific gravity of the particular caustic soda solution, which can be obtained from a standard reference book such as "Handbook of Chemistry," compiled and edited by Lange, McGraw-Hill Book Co., 1961. For example, to determine the composition of the liquid phase when the quantity of caustic soda is 8.7 kg. per fraction of 10 litres of water present in the liquid phase, as is found for the minimum quantity of caustic soda in the first example of Table 4, NaOH = 8.7 kg.
Water = 10 kg.
Total weight of liquid phase = 18.7 kg.

Therefore 1 kg. of this solution will contain:

8.7/18.7 = 0.465 kg. NaOH
10/18.7 = 0.535 kg. water

The specific gravity of this solution at 20° C. is 1.49, hence 1 litre of solution will contain:

0.465 × 1.49 = 0.69 kg. NaOH
0.535 × 1.49 = 0.80 kg. $H_2O$

Quantities of caustic soda or water to be used per litre of liquid volume per metric ton of batch, corresponding to any of the values listed in the data of the tables can be derived in the same manner. The thus-derived quantities of caustic soda and water to be added to the batch will be those forming the liquid phase. In practice, using the quantities derived in this way, it is necessary only to multiply the quantities of caustic soda and water required by the desired volume of liquid phase in order to determine the quantities of caustic soda and water (in addition to the water of hydration when required), to provide the desired volume of liquid phase.

The water content must always be sufficient to make the required volume of liquid phase, that volume being preferably of the order of 5 to 30 litres per metric ton of batch.

In Tables 2a–4a which follow the quantities of water and caustic soda from Tables 2–4, respectively are converted to the quantities required for one litre of liquid volume per metric ton of batch.

Table 2a

| NaOH, kg./m.t. of batch | $H_2O$ in liquid phase, l./m.t. of batch | NaOH, kg./kg. of liquid phase | $H_2O$, kg./kg. of liquid phase | Sp. gravity of liquid phase | NaOH, kg./l. of liquid phase | $H_2O$, kg./l. of liquid phase |
|---|---|---|---|---|---|---|
| 3.1 | 10 | 0.236 | 0.76 | 1.26 | 0.30 | 0.96 |
| 0.5 | 10 | 0.0476 | 0.95 | 1.05 | 0.05 | 1.0 |

Table 3a

| NaOH, kg./m.t. of batch | $H_2O$ in liquid phase, l./m.t. of batch | NaOH, kg./kg. of liquid phase | $H_2O$, kg./kg. of liquid phase | Sp. gravity of liquid phase | NaOH, kg./l. of liquid phase | $H_2O$, kg./l. of liquid phase |
|---|---|---|---|---|---|---|
| 5.5 | 10 | 0.355 | 0.645 | 1.38 | 0.49 | 0.89 |

Table 4a

| NaOH, kg./m.t. of batch | $H_2O$ in liquid phase, l./m.t. of batch | NaOH, kg./kg. of liquid phase | $H_2O$, kg./kg. of liquid phase | Sp. gravity of liquid phase | NaOH, kg./l. of liquid phase | $H_2O$, kg./l. of liquid phase |
|---|---|---|---|---|---|---|
| 8.7 | 10 | 0.465 | 0.535 | 1.49 | 0.69 | 0.80 |
| 6.5 | 10 | 0.394 | 0.606 | 1.42 | 0.56 | 0.86 |
| 22.2 | 10 | 0.69 | 0.31 | 1.72 | 1.19 | 0.53 |

The examples mentioned in the present specification and reproduced in the Tables 1 to 4, are based on typical batches containing 185 kg. of sodium carbonate per metric ton, as shown at the beginning of the specification. Nevertheless, it is necessary to point out that the quantities of caustic soda to be used remain unchanged when different proportions of sodium carbonate are used in the batches; it is necessary, however, to make sure that the quantity of water present be such that it may form the required numbers of litres of moistening solution, taking into account, that in the cases recorded in Tables 1 to 3, a certain quantity of water is fixed by making hydrates of sodium carbonate. Similarly, the data are valid for all glass making batches containing sodium carbonate, whatever the nature and the proportions of the other components used.

The invention may also apply to the treatment of mixtures of sand and sodium carbonate for the manufacture of products other than glass, for example for mixtures for the preparation of sodium silicate.

The caustic soda used according to the invention may be added in the dry state or in a state of solution. It may be incorporated to the batch during the mixing of the various ingredients or added to one of the components before introducing it into the mixer. On the other hand, it is quite obvious that caustic soda can replace part of the sodium carbonate, since the quantities of caustic soda added to the batch can be counted as $Na_2O$ for the calculation of the quantity of sodium carbonate to be introduced.

At least, it goes without saying that the action of caustic soda can be combined with that of other known agents used for the improving of the properties of glass making batches. Thus it is possible to combine the action of caustic soda with that of sodium chloride; in this case, the required quantities of caustic soda are generally smaller but there is a limit beyond which the quantity of caustic soda to be used does no longer decrease, even if the quantity of sodium chloride in the mixture is raised. The relative drop in the proportion of caustic soda to be used is all the greater as the minimum temperature to reach is higher.

The examples mentioned in the Table 5, illustrate this use of the combination of caustic soda and sodium chloride in a batch similar to that described in column 1, when this batch is to have a moist state which does not depend on the temperature, from a minimum temperature $t_3$.

Table 5

| Volume of liquid phase, l./m.t. of batch | Water present in the liquid phase, l./m.t. of batch | Minimum temperature $t_3$, °C. | Minimum quantities of NaOH, kg./m.t. of batch | | Quantities of water, kg./m.t. of batch |
|---|---|---|---|---|---|
| | | | NaOH | NaCl | |
| 11 | 10 | 0  | 2.9 | 1.2 | 40 (30+10) |
| 11 | 10 | 15 | 1.8 | 1.7 | 40 (30+10) |
| 11 | 10 | 25 | 0.6 | 2.1 | 40 (30+10) |
| 11 | 10 | 26 | 0   | 2.2 | 40 (30+10) |

In Table 5a the quantities of NaCl and NaOH from Table 5 are converted to the quantities required for a litre of liquid volume per metric ton of batch.

Table 5a

| NaOH, kg./m.t. of batch | NaCl in liquid, l./m.t. of batch | NaOH, kg./kg. of liquid phase | NaCl, kg./kg. of liquid phase | Sp. gravity of liquid phase | NaOH, kg./l. of liquid phase | NaCl, kg./l. of liquid phase |
|---|---|---|---|---|---|---|
| 2.9 | 1.2 | 0.206 | 0.085 | 1.28 | 0.26 | 0.11 |
| 1.8 | 1.7 | 0.133 | 0.126 | 1.23 | 0.16 | 0.15 |
| 0.6 | 2.1 | 0.047 | 0.165 | 1.15 | 0.05 | 0.19 |

It appears from Table 2, that in order to maintain about 10 litres of constant liquid phase, per metric ton of batch, from 0° C., about 3.1 kg. of caustic soda are required per metric ton of batch; the values relating to the temperatures of 15 to 25° C. were also given. However, it appears from Table 5 above, that in the presence of at least 1.2, 1.7, 2.1 and 2.2 kg. of sodium chloride per metric ton, the required quantities of caustic soda are reduced respectively to 2.9, 1.8, 0.6 and 0 kg. per metric ton at the temperatures $t_3$ of 0, 15, 25 and 26° C. The values relating to the intermediate temperatures $t_3$ can easily be obtained by interpolation of those appearing in the table.

The figures above correspond to the maximum decrease possible of the quantity of caustic soda to be used, thanks to the concomitant use of sodium chloride. It is obvious that the use of quantities of sodium chloride lower than those mentioned is also covered by the present invention.

We claim:
1. In the preparation of a glass-making batch containing sand and sodium carbonate in quantities effective to form glass, the improvement which comprises providing in said batch a free liquid volume of from 5 to 30 litres per metric ton of batch effective to provide and preserve in said batch, at storing temperatures lower than 35° C., a sufficiently moist state to impart to said batch improved properties for storing and use, said liquid volume being provided by the steps which comprise adding to said batch a quantity of caustic soda ranging from about 0.05 to 1.19 kg. per litre of said volume the minimum quantity of said caustic soda being about 0.05 kg. for a storage temperature of about 33° C. and about 0.30 kg. for a storage temperature of about 0° C. and the maximum quantity of said caustic soda being about 0.49 kg. for a storage temperature of about 0° C. and 1.19 kg. for a storage temperature of about 35° C., adding to said batch a quantity of water ranging from about 1.0 to 0.53 kg. per litre of said liquid volume, and adding to said batch for a storage temperature below about 15° C. and for a storage temperature above 15° C. when said quantity of caustic soda is in the range of about 0.05 kg. to 0.49 kg. per litre of said liquid volume an additional quantity of water necessary to convert said sodium carbonate in said batch into sodium carbonate monohydrate.

2. A process as defined in claim 1 wherein the formation of sodium carbonate monohydrate is avoided and there is obtained directly a moist state which does not depend on temperature and time at minimum temperatures ranging from about 35° C. to about 15° C. wherein the minimum quantity of caustic soda added is about 0.56 to about 0.69 kg. per litre of liquid volume, the maximum quantity of caustic soda is about 1.19 kg. per litre of liquid, the minimum quantity of water is about 0.53 kg. per litre of liquid volume and the maximum quantity of water is about 0.86 to about 0.80 kg. per litre of liquid volume.

3. A process as defined in claim 1, wherein said batch is effective to remain moist at minimum temperatures ranging from about 33° to 0° C., and wherein the minimum quantity of caustic soda added is about 0.05 to about 0.30 kg. per litre of said liquid volume, the maximum quantity of caustic soda is about 0.49 kg. per litre of liquid volume, the minimum quantity of water is about 0.89 kg. per litre of liquid volume and the maximum quantity of water is about 1.0 to about 0.96 kg. per litre of liquid volume in addition to the quantity of water necessary to convert said sodium carbonate in said batch into sodium carbonate monohydrate.

4. A process as defined in claim 3 wherein in addition to said caustic soda and said water, sodium chloride is added to said batch and wherein the minimum quantity of caustic soda added is less than is required in the absence of sodium chloride, said minimum quantity of sodium hydroxide per litre of liquid volume being about 0.26 kg. when about 0.11 kg. of sodium chloride per litre of liquid volume is added and said storage temperature is about 0° C., about 0.16 kg. when about 0.15 kg. of sodium chloride per litre of liquid volume is added, and said storage temperature is about 15° C., and about 0.05 kg. when about 0.19 kg. of sodium chloride per litre of liquid volume is added and said storage temperature is about 25° C.

5. In the preparation of a glass-making batch containing sand and sodium carbonate in quantities effective to form glass, the improvement which comprises providing in said batch a free liquid volume of from 5 to 30 litres per metric ton of batch effective to provide and preserve in said batch, at temperatures lower than 35° C., a sufficiently moist state to impart to said batch improved properties for stocking and use, said liquid volume being provided by the steps which comprise adding to said batch a quantity of caustic soda ranging from about 0.05 to 1.19 kg. per litre of said liquid volume and a quantity of water ranging from about 1.0 to about 0.53 kg. per litre of said liquid volume, the minimum quantity of said caustic soda being greater the lower said temperatures and the maximum quantity of caustic soda being lesser the lower said temperatures, and an additional quantity of water sufficient to convert said sodium carbonate into sodium carbonate monohydrate when the said temperatures are lower than 15° C. and when said temperatures are above 15° C. and said quantity of caustic soda is in the range of about 0.05 to 0.49 kg. per litre of said liquid volume.

References Cited in the file of this patent

UNITED STATES PATENTS

| 1,543,770 | Hilbert | June 30, 1925 |
| 2,220,750 | Bair | Nov. 5, 1940 |
| 2,611,712 | Ford | Sept. 23, 1952 |
| 2,773,775 | Levengood | Dec. 11, 1956 |
| 2,895,839 | George | July 21, 1959 |

FOREIGN PATENTS

| 2,284 | Great Britain | Aug. 18, 1870 |